United States Patent Office 3,210,405
Patented Oct. 5, 1965

3,210,405
UNSATURATED ESTERS OF PROPIOLIC ACID
Lee A. Miller, Dayton, Ohio, assignor to Monsanto
Company, a corporation of Delaware
No Drawing. Filed Jan. 3, 1961, Ser. No. 80,028
6 Claims. (Cl. 260—486)

The present invention relates to esters and more particularly provides new and valuable esters of propiolic acid and certain unsaturated alcohols, the method of preparing the same, biological toxicant compositions comprising the new esters, and method of inhibiting the growth of microorganisms in which said compositions are used.

According to the invention, propiolates of cyclic olefinic and acetylenic unsaturated hydrocarbon alcohols are prepared by the reaction of the respective alcohol with propiolic acid or an acyl halide or an anhydride thereof, the reaction with, e.g., propiolyl chloride, proceeding as follows:

in which R is an unsaturated, aralkenyl or acetylenic hydrocarbon radical having from 3 to 12 carbon atoms and being attached to the rest of the molecule of which it forms a part through a carbon atom of an aliphatic hydrocarbon portion thereof.

The unsaturated hydrocarbon alcohol R—OH may contain a cyclic radical as substituent, e.g., an aryl group such as the phenyl or xylyl radical or a cycloalkyl group such as the cyclohexyl or cyclopropyl radical. The presently useful alcohols may thus be, e.g., alkynols, alkenynols, arylalkenols, alkenylaralkanols, alkynylaralkanols, cycloalkylalkenols, arylalkadienols, cycloalkylalkadienols, arylalkynols, cycloalkylalkynols, aryalkenynols or cycloalkylalkenynols.

Examples of propiolates provided by the invention and the unsaturated alcohols from which they are prepared are:

Propargyl propiolate from propargyl alcohol;
2-pentylyl propiolate from 2-pentyn-1-ol;
1-ethyl-2-propynyl propiolate from 1-pentyn-3-ol;
2-penten-4-ynyl propiolate from 2-penten-4-yn-1-ol;
2-phenyl-3-butynyl propiolate from 2-phenyl-3-butyn-1-ol;
3-phenyl-2-butenyl propiolate from 3-phenyl-2-buten-1-ol;
1-methyl-3-p-tolyl-2-propenyl propiolate from 4-p-tolyl-3-buten-2-ol;
α-vinylbenzyl propiolate from α-vinylbenzyl alcohol;
o-, m- or p-vinylbenzyl propiolate from o-, m- or p-vinylbenzyl alcohol;
3-phenyl-2-propynyl propiolate from 3-phenyl-2-propyn-1-ol;
α-ethynylbenzyl propiolate from α-ethynylbenzyl alcohol;
α-vinylcyclohexylmethyl propiolate from α-vinylcyclohexylmethanol;
[3-(2-propenyl)cyclopentyl]methyl propiolate from [3-(2-propenyl)cyclopentyl]methanol;
2-(o-, m- or p-ethynylphenyl)ethyl propiolate from 2-(o-, m- or p-ethynylphenyl) ethanol.

Owing to the ready availablity of the starting alcohols, of particular interest are the alkynyl propiolates and the aralkenyl propiolates.

Reaction of the unsaturated alcohol with the propiolic acid or acyl halide or anhydride thereof takes place readily by simply contacting the acidic compound with the alcohol at ordinary or increased temperature and in the presence of an inert diluent or solvent. Advantageously, when propiolic acid is used, reaction is effected at a temperature of from, say 50° C. to 120° C. and heating within this temperature range is conducted until the desired extent of esterification has occurred. Using the propiolyl halide, i.e., propiolyl chloride, bromide, iodide or fluoride, optimum conditions include operation at temperatures which may be as low as, say —10° C., i.e., extraneous heating will be generally unnecessary; instead, cooling may be employed. Since formation of the ester occurs by reaction of one mole of the alcohol with one mole of the propiolic acid compound, the two reactants are advantageously employed in such stoichiometric proportion. However, an excess of the acidic compound may be employed, since any unreacted acid, anhydride or halide may be readily removed from the reaction product.

The presence of an inert diluent or solvent and operation at a temperature which is below 120° C. is advantageous in avoiding side-reactions, e.g., polymerization; operation in this manner apparently permits substantial limitation of the reaction to esterification, rather than to other reactions which could be expected to occur with the highly active, triple-bonded acidic compounds and the unsaturated alcohol.

Inert liquid diluents which are useful for the present purpose are liquid hydrocarbons generally, halogenated hydrocarbons, ethers, or ketones, e.g., benzene, toluene, xylene, hexane, petroleum spirits, dichlorobenzene, ethylene dichloride, carbon tetrachloride, tetrachlorohexane, dioxane, isopropyl ether, acetone, butanone, etc. The solvent or diluent, of course, serves to facilitate uniform distribution of the reactants throughout the reaction medium. When reacting a propiolyl halide with the unsaturated alcohol, it is preferred to employ a solvent or diluent which minimizes the tendency of the hydrogen halide by-product to react with the triple bond of the propiolic acid compound. In this connection the solvent or diluent is selected on the basis of being the least compatible or having the poorest solvency for hydrogen halide. The preferred solvents or diluents for this purpose may be the cycloalkanes, e.g., cyclohexane, cyclopentane or the alkyl substituted cycloalkanes, etc., and the halogenated hydrocarbons.

When using propiolic acid as the starting material in the esterification reaction, water is formed as a by-product material. Since the reaction is of the equilibrium type, it is preferred that the by-product water be removed continuously during the course of the reaction in order to have the equilibrium shift in the desired direction. The solvent or diluent employed in the reaction may be selected on the basis that it will form an azeotrope with water or that it boils above water, and thus the temperature of reaction can be maintained at a level which facilitates removal of the water without affecting the solvent or diluent. Considering the pre-requisites of a solvent or diluent, generally any organic material which is non-reactive with either the reactants or the product materials may be employed. The quantity of solvent or diluent employed in the reaction varies considerably depending upon the result which is desired. In some instances it may be desirable to employ a relatively small quantity of diluent as compared to the amount of reactants which are being used, whereas in other cases it may be desirable to use a relatively large quantity of solvent or diluent to facilitate intermixing of the reactants.

I have also found that when effecting the reaction with the free acid or the acid anhydride as the acid component, it is advantageous to operate in the presence of an acidic material as catalyst. Acids which are useful for this purpose are, e.g., the mineral acids such as sulfuric, hydrochloric, nitric or phosphoric acid, or chlorosulfonic acid, acidic salts such as ferric chloride or mangesium bisulfate, organic sulfonic acids such as benzenesulfonic acid, 4-toluenesulfonic acid, etc.

The presently provided unsaturated esters of propiolic acid are stable, well-characterized compounds which are advantageously employed for a variety of industrial and agricultural purposes, e.g., as polymerizable monomers in the synthetic resins industry: as copolymerizing cross-linking monomers with vinyl compounds in synthetic rubber and plastics manufacture; and, as will be hereinafter shown, as toxicant compositions effective in preventing or inhibiting the growth of fungi.

The invention is further illustrated by, but not limited to, the following examples:

*Example 1*

A mixture consisting of 26.8 g. (0.2 mole) of cinnamyl alcohol, 15.4 g. (0.22 mole, 10% excess) of propiolic acid, 0.5 g. of p-toluenesulfonic acid, and 150 ml. of benzene was stirred at reflux under a Dean-Stark apparatus for 2 hours, at the end of which time 3.5 ml. (97% of theory) of water had evolved. Heating was then discontinued and the reaction mixture was allowed to stand overnight. At the end of this time, 100 ml. of ether was added to the mixture and the whole was washed first with 10% aqueous sodium bicarbonate and then with water. After drying over magnesium sulfate, the washed product was filtered and evaporated to give a brown, glassy residue. Infared analysis showed the following structures:

≡CH at 3300 cm.$^{-1}$
C≡CH at 2120 cm.$^{-1}$
C=O-ester at 1720 cm.$^{-1}$
C=C-aromatic at 1600, 1500 cm.$^{-1}$
C—O—C-ester at 1225 cm.$^{-1}$.

The above data verify the residue to be cinnamyl propiolate.

*Example 2*

A mixture consisting of 11.2 g. (0.2 mole) of propargyl alcohol, 15.4 g. (0.22 mole, 10% excess) of propiolic acid, 150 ml. of benzene and 0.3 g. of p-toluenesulfonic acid was stirred at reflux for 16 hours under a Dean-Stark column. The reaction mixture was washed first with two 100 ml. portions of 10% aqueous sodium bicarbonate and subsequently with three 100 ml. portions of distilled water. The organic layer was evaporated at water-pump pressure below 35° C. Distillation of the residue gave the substantially pure propargyl propiolate, B.P. 47° C./20 mm., $n_D^{25}$ 1.4453, and analyzing 66.62% carbon and 3.99% hydrogen as against 66.67% and 3.73%, the respective calculated values. Infrared analysis gave the following:

≡CH at 3250 cm.$^{-1}$
—CH, aliphatic at 2900 cm.$^{-1}$
—C≡CH at 2120 cm.$^{-1}$
—C=O-ester at 1700 cm.$^{-1}$
—C—O-ester at 1230 cm.$^{-1}$
≡CH at 755 cm.$^{-1}$.

*Example 3*

A mixture consisting of 26.8 g. (0.2 mole) of a commercially available mixture of m- and p-vinylbenzyl alcohol, 15.4 g. (0.22 mole, 10% excess) of propiolic acid and 150 ml. of benzene was stirred at reflux under a Dean-Stark apparatus for 6 hours. At the end of that time, 0.5 g. of p-toluenesulfonic acid was added, and refluxing was resumed for an additional 6 hours. At this point, 3.4 ml. (95% of theory) of water had collected. After the reaction mixture had cooled to room temperature, 100 ml. of ether was added, the whole was washed first with two 100 ml. portions of 10% aqueous sodium bicarbonate and then with two 100 ml. portions of water, and subsequently dried over magnesium sulfate. The sulfate was removed by filtration and the solvent evaporated to give as residue 36.7 g. of a yellow oil which upon distillation gave a mixture of m- and p-vinylbenzyl propiolate, B.P. 95–100° C./0.3 mm., a colorless oil. Infrared analysis showed the following structures:

≡CH at 3250 cm.$^{-1}$
Aromatic CH— at 3020 cm.$^{-1}$
Aliphatic CH$_2$ at 2950 cm.$^{-1}$
—C=O ester at 1720 cm.$^{-1}$
C=C at 1625 cm.$^{-1}$
—C=C, aromatic at 1600, 1580, 1490 cm.$^{-1}$
—C—O-ester at 1220 cm.$^{-1}$
—CH=CH$_2$ at 990, 910 cm.$^{-1}$.

*Example 4*

The propargyl propiolate of Example 2 was tested against the soil fungus Pythium. Testing was conducted by adding to soil which had been uniformly infected with the fungus a quantity of the propiolate which was 0.003% of the weight of the soil, thoroughly mixing the whole, incubating at 25° C. for 24 hours, seeding pots of the incubated soil with cotton and cucumber seeds, maintaining the seeded pots for 48 hours at 70° F. and at a high relative humidity (95–98%), removing the pots to the greenhouse, maintaining them there for 2 weeks, and inspecting them for number of seedlings emerged and the condition of the shoots and roots thereof. A similar testing procedure was conducted with "controls," i.e., similarly inoculated soil which had not been chemically treated. A very poor percent emergence and a stunted diseased condition of those of the plants which had emerged was noted in the controls, whereas excellent germination and plant growth was observed in the pots of inoculated soil which contained the 0.003% concentration of propargyl propiolate. The propargyl propiolate was likewise found to inhibit the growth of the soil fungus *Rhyizoctonia solani*.

Fungistat compositions containing the present compounds are advantageously formulated by first preparing a solution thereof in an organic solvent and then adding the resulting solution to water containing an emulsifying agent to form an oil-in-water emulsion. Emulsifying agents which may be employed are those customarily used in the art for the preparation of oil-in-water emulsions, e.g., the higher alkylbenzenesulfonates, the long chained polyalkylene glycols, the long chained alkylsulfosuccinates, etc.

While the present compounds are most advantageously employed as biological toxicants by incorporating them into an emulsion as herein described, they may also be incorporated in to solid carriers such as clay, talc, pumice or bentonite to give compositions which may be applied either to infested areas or to locale which may be subjected to infestation. They may also be dissolved in liquefied gases such as the fluorochloroethanes or methyl chloride and applied from aerosol bombs containing the solution.

The unsaturated alcohol esters of propiolic acid which are provided by the invention are of interest per se as intermediates for the synthesis of numerous compounds. The two or more unsaturated bonds of the present esters are very useful in syntheses not only owing to the reactivity which generally accompanies unsaturation but also owing to the activating effect of the ester radical on the olefinic and acetylenic bonds. Compounds containing reactive hydrogen add across the triple bond, thus:

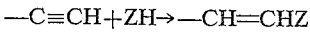

where Z is an organic residue.

The olefinic and/or acetylenic bonds are readily halogenated or hydrogenated with production of either the fully saturated or olefinically unsaturated esters, depending upon the reaction conditions. The olefinic esters thus obtained undergo vinyl-type polymerization alone, to give homopolymers of high molecular weight or they copolymerize with other unsaturated compounds. The present unsaturated esters are also readily epoxidized to give compounds for use in the manufacture of epoxy-type resins. Accordingly, to one skilled in the art of organic synthesis, the present compounds are building materials of great potential.

What I claim is:
1. A compound of the formula

$$R-O-\overset{\overset{O}{\|}}{C}-C\equiv CH$$

in which R is a radical selected from the group consisting of aralkenyl radicals having from 8 to 12 carbon atoms, and alkynyl radicals having from 3 to 12 carbon atoms and being attached to the rest of the molecule of which it forms a part through a carbon atom of an aliphatic hydrocarbon portion thereof.

2. A compound of the formula $$R-O-\overset{\overset{O}{\|}}{C}-C\equiv CH$$

in which R is an alkynyl radical.

3. An alkynyl propiolate having from 3 to 12 carbon atoms in the alkynyl radical.
4. An aralkenyl propiolate having from 8 to 12 carbon atoms in the aralkenyl radical.
5. Cinnamyl propiolate.
6. Propargyl propiolate.

References Cited by the Examiner

Heaton et al.: J. Am. Chem. Soc., vol. 71, pp. 2948–2949 (1949).

LORRAINE A. WEINBERGER, *Primary Examiner.*

ROGER L. CAMPBELL, *Examiner.*